Nov. 16, 1965 E. E. EVANS ET AL 3,218,529

PLURAL MOTOR TAPE DECK TRANSPORT INCLUDING TENSIONING, DYNAMIC BRAKING AND REVERSING

Filed Oct. 9, 1962 2 Sheets-Sheet 1

INVENTORS.
EMIL E. EVANS
EDWARD A. MARHEINE

BY C. A. Gulbrandsen

ATTY.

Nov. 16, 1965 E. E. EVANS ET AL 3,218,529

PLURAL MOTOR TAPE DECK TRANSPORT INCLUDING TENSIONING, DYNAMIC BRAKING AND REVERSING

Filed Oct. 9, 1962 2 Sheets-Sheet 2

INVENTORS.
EMIL E. EVANS
EDWARD A. MARHEINE
BY C. A. Gulbrandsen
ATTY.

United States Patent Office 3,218,529

Patented Nov. 16, 1965

3,218,529

PLURAL MOTOR TAPE DECK TRANSPORT INCLUDING TENSIONING, DYNAMIC BRAKING AND REVERSING

Emil E. Evans and Edward A. Marheine, Milwaukee, Wis., assignors, by mesne assignments, to Automatic Electric Laboratories, Inc., Northlake, Ill., a corporation of Delaware Filed Oct. 9, 1962, Ser. No. 229,405
9 Claims. (Cl. 318—7)

This invention relates in general to motor control circuits and more specifically to magnetic tape deck transport mechanisms adapted for use with sound recording and reproducing apparatus, wherein this apparatus is more commonly identified with tape recorders and reproducers and/or automatic telephone answering and message recording machines.

In the previous electro-mechanical transport mechanisms using tape as the recording medium, a varying amount of mechanical friction was inherent in each mechanism, with the electric motors used therein having less efficient bearings of the non ball bearing type to further increase this friction. Therefore, when the transport mechanism was operated in any of its functions, various mechanical braking arrangements were devised to stop the machine from these functions without damaging or breaking the tape. However, these mechanical braking arrangements required constant attention and adjustment in order to avoid damaging the tape and to provide proper operation of the mechanism.

In the present day electrical transport mechanisms, the mechanical friction has been reduced to a negligible amount. Due to this reduced friction, a problem arises in that the tape is wound very loosely on the reels, especially when the transport mechanism is operated in the rewind or fast forward operation. As a result, when a mechanical braking arrangement was used, the tension applied to the tape would tend to cause the loosely wound tape to slip on the reels and at times fold under, or form a loop and be damaged. Additionally, in the event of a power failure during the above operations, the reels would tend to coast to a stop and the tape would spill from the reels.

The main object of the present invention is to provide a simplified and economical tape deck transport mechanism of the above character, whereby movement of the tape is controlled in an efficient and reliable manner.

In accordance with this invention, the above noted object is satisfactorily met by the provision of an improved tape deck transport mechanism suitable for use with tape recorders and reproducers and/or automatic telephone answering and message recording machines, the general features and appearances corresponding to the transport mechanism as disclosed in U.S. patent application Serial No. 224,906 filed September 20, 1962 by C. M. Martin et al. In this manner, electrical means is provided whereby the magnetic tape is firmly wound on the reels during the various operations of the transport mechanism, an electrical stopping brake is provided to bring the mechanism to a stop from an operating function, a standby brake is provided to maintain tension on the tape after the mechanism has stopped and an alternate electrical stopping brake is provided to bring the mechanism to a stop in the event of a power failure during an operating function of the mechanism.

A feature of the invention relates to the provision of electrical means to control a tape deck transport mechanism to ensure movement of the tape in all functions, to wind the tape under slight tension on the reels, to bring the mechanism to a stop from all functions, to maintain a standby brake thereon after the mechanism has stopped and to bring the mechanism to a stop in the event of a power failure.

Another feature of the invention resides in the provision of means, whereby simultaneous with the forward motor being energized by a full amount of current to operate the mechanism in a fast forward operation, the rewind motor is energized by a reduced amount of current to insure a light electrical pull on the rewind motor, thereby resulting in a tight wind of the tape on the reels.

A further feature of the invention resides in the provision of means, whereby simultaneous with the rewind motor being energized by a full amount of current to operate the mechanism in a rewind operation, the forward motor is energized by a reduced amount of current to insure a light electrical pull on the forward motor, thereby resulting in a tight wind of the tape on the reels.

Another feature of the invention resides in the provision of means, whereby in the event of a power failure during an operating function of the mechanism, a charged condenser is utilized as an auxiliary power source to energize electrical apparatus for a suffiicent length of time to bring the mechanism to a stop and prevent spilling of the tape from the reels.

In a preferred embodiment of this invention, the tape deck transport mechanism is disclosed as consisting primarily of a forward motor, a rewind motor, a capstan motor, a pressure roller magnet, a forward relay, a rewind relay, a play relay and a series relay. Function selecting switches are provided to initiate the operation and control of the mechanism in the play operation, the rewind operation, and the fast forward operation.

The nature of the invention and its distinguishing features and advantages will be more clearly understood from the following detailed operational description and the accompanying drawings in which.

In its preferred form, such as disclosed in the present application, a general description of the invention will now be given.

GENERAL DESCRIPTION

Figure 1:
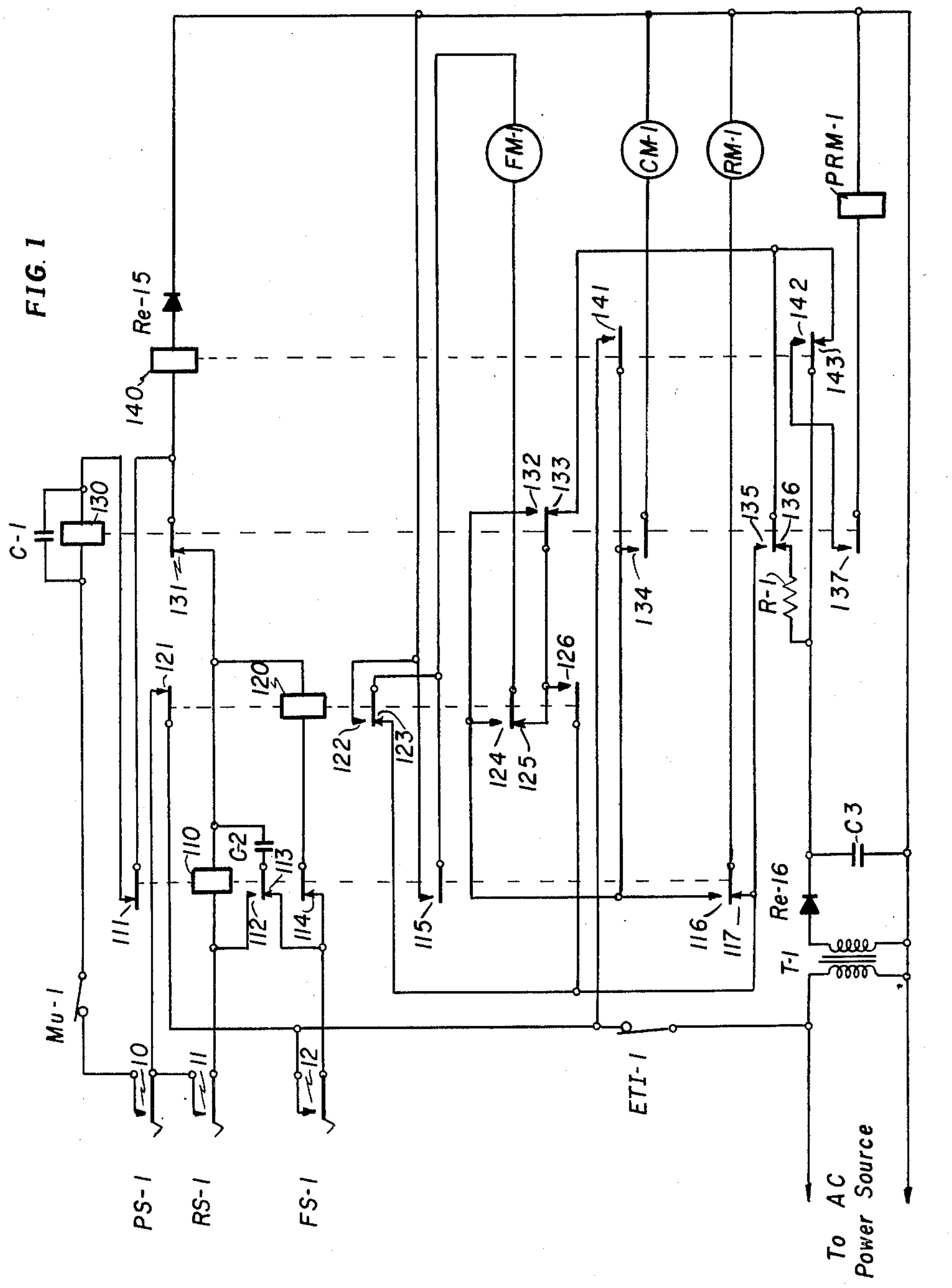
FIG. 1 shows in schematic form the circuit arrangement of the improved tape deck transport mechanism according to the invention.

Reference will be had with FIG. 1 of the drawings for this portion of the general description, wherein it will be noted that in order to operate the tape deck transport mechanism, a conventional 115 volt 60 cycle alternating current power supply is connected to the power transformer T–1. It will be noted that the mechanism consists essentially of a forward motor, rewind motor and capstan motor, included in a circuit arrangement with a forward relay, rewind relay, play relay and a series relay. Function selecting switches comprising the play switch, rewind switch and forward switch are included in this circuit arrangement, whereby operation of the mechanism may be initiated and controlled.

In the standby condition, forward motor FM–1 and rewind motor RM–1 are energized by means of rectified current to maintain a constant slight tension on the tape in order to take up all slack thereon and prevent loops from forming therein, and to maintain a standby brake on the mechanism.

Play switch PS–1 is operated to initiate the operation of the mechanism in the play operation, whereby play relay 130 and series relay 140 are energized in series to complete an alternating current series energizing circuit for the forward motor FM–1 and the rewind motor RM–1 and to complete an alternating current energizing circuit for the capstan motor CM–1. In this manner the forward motor FM–1 and rewind motor RM–1 maintain the proper tension on the tape during the time that the capstan motor pulls the tape across the record, or play back, heads. When play switch PS–1 is restored, series relay 140 releases and play relay 130 is held operated by the charge on condenser C–1, whereby forward motor FM–1 and capstan motor CM–1 are energized in series but in parallel with rewind motor RM–1 over a rectified current circuit to bring the mechanism to a stop from the play operation. At this time play relay 130 restores and forward motor FM–1 and rewind motor RM–1 are energized over a rectified current circuit to provide the standby brake on the mechanism.

Forward switch FS–1 is operated to initiate the operation of the mechanism in the fast forward operation whereby forward relay 120 and series relay 140 are energized in series over a rectified current circuit to complete an alternating current energizing circuit for forward motor FM–1 and a reduced rectified current energizing circuit for the rewind motor RM–1. In this manner, forward motor FM–1 moves the tape at full speed, with the rewind motor RM–1 providing a slight amount of drag on the tape to insure a tight wind thereof. When forward switch FS–1 is released, series relay 140 restores and forward relay 120 remains operated due to the charge on condenser C–2, whereby rewind motor RM–1 is energized by the full amount of rectified current to apply a full braking effect on the mechanism and bring it to a stop. At this time forward relay 120 restores and the previously mentioned rectified current energizing circuit to forward motor FM–1 and rewind motor RM–1 is completed to apply the standby brake on the mechanism.

Rewind switch RS–1 is operated to initiate the operation of the mechanism in the rewind operation, whereby rewind relay 110 and series relay 140 are energized in series to complete an alternating current energizing circuit for rewind motor RM–1 and a reduced rectified current energizing circuit to forward motor FM–1. In this manner, rewind motor RM–1 operates at full speed to move the tape, with forward motor FM–1 providing a slight amount of drag on the tape to insure a tight wind thereof. When rewind switch RS–1 is released, series relay 140 restores and rewind relay 110 remains operated due to the charge on condenser C–2, whereby forward motor FM–1 is energized by the full amount of rectified current to apply the full braking effect on the mechanism to bring it to a stop. At this time rewind relay 110 restores and forward motor FM–1 and rewind motor RM–1 are energized in series by the rectified current circuit to apply the standby brake on the mechanism.

In the event of a power failure from the A.C. power source during the time that the mechanism is operating in any of the particular functions, the corresponding operated motors will stop and the operated relays will restore from this function in the same manner as if the particular function selecting switch were restored. However in order to prevent spilling of the tape from the supply or takeup reels, due to the fact that the normal braking arrangement would be ineffective, an alternate braking arrangement using a different source of power is provided and becomes effective, in response to the power failure. At the time of the power failure, the series relay 140 restores in the same manner as previously mentioned and the corresponding function relay is maintained operated by the charged condensers either C–1 or C–2. The alternate braking arrangement becomes effective, whereby the charge on condenser C–3 is discharged over the formerly described braking circuit individual to that function to operate the motor or motors corresponding thereto to bring the mechanism to a stop. In this manner no tape is spilled from the reels.

Figure 2:
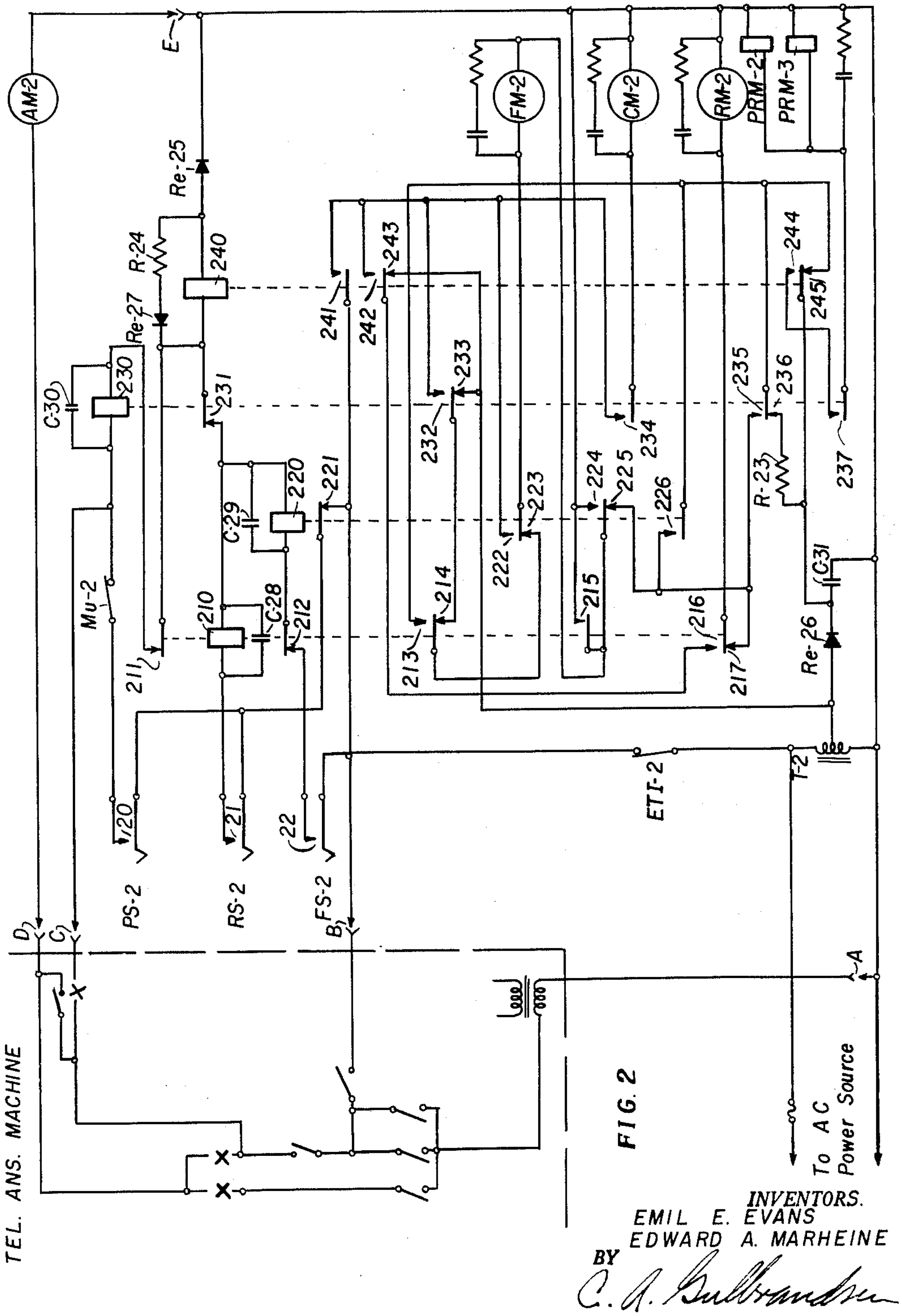
FIG. 2 shows in schematic form a modified circuit arrangement of the improved tape deck transport mechanism and further shows an arrangement whereby a practical application of this invention may be used with an automatic telephone answering and message recording machine.

Reference will be had with FIG. 2 of the drawings for this portion of the general description, wherein it will be noted that in order to operate the tape deck transport mechanism, conventional 115 volt 60 cycle alternating current is connected to the auto-transformer T–2. It will be noted that the mechanism consists essentially of a forward motor, rewind motor and capstan motor, included in a circuit arrangement with a forward relay, rewind relay, play relay and a series relay. Function selecting switches comprising the play switch, rewind switch and forward switch are included in this circuit arrangements, whereby operation of the mechanism may be initiated and controlled.

Before commencing the general description of FIG. 2, it is thought advisable to mention that an arrangement is disclosed, whereby the tape deck transport mechanism may be connected with the apparatus of a telephone answering and message recording machine merely by means of completing the connections shown at points A, B, C, D and E. It will be appreciated that an automatic telephone answering and message recording machine must also include means for transmitting a prerecorded announcement to a calling line, thereby requiring an announcement motor and the necessary apparatus. Therefore, the announcement motor, such as AM–2, may be connected to the tape deck transport mechanism by completing the connections shown at D and E. It is pointed out that these above-mentioned connections and arrangement represents one practical application of the mechanism of FIG. 2 and does not constitute a part of the instant disclosure.

It is not thought necessary to mention the operations of FIG. 2 in detail as has been done for FIG. 1, since the operations of the mechanism of FIG. 2 are quite similar thereto. However, the ensuing paragraph will point out the major differences of FIG. 2, when compared with FIG. 1.

In the standby condition, the standby brake circuit for energizing forward motor FM–2 and rewind motor RM–2 in series consists of a reduced alternating current rather than the rectified current as used in FIG. 1. Forward motor FM–2 and rewind motor RM–2, however, maintain the constant tension of the tape in the same manner as described for FIG. 1. When the mechanism of FIG. 2 is operated in either the play or fast forward operation, the same operations take place as described for FIG. 1 with the exception, that the standby brake circuit is reduced alternating current instead of rectified current as described in FIG. 1. When the mechanism of FIG. 2 is operated in the rewind operation, the operations are the same as for FIG. 1, with the exception that when the machine is being brought to a stop from the rewind operation, the rewind motor is energized by reduced alternating current simultaneous with the forward motor being energized by the full alternating current, whereby the rewind motor prevents a loop from forming in the tape during the time that the forward motor applies the full braking action. The standby braking circuit is also reduced alternating current instead of rectified current. In the event of a power failure, the apparatus of FIG. 2 operates in the same manner as described for FIG. 1.

Having described the invention in general, a detailed operational description of the tape deck transport mechanism as disclosed in FIGS. 1 and 2 will hereafter be given.

DETAILED OPERATIONAL DESCRIPTION

*FIG. 1*

During the following detailed operational description, reference will be had with FIG. 1 of the drawings, with the tape deck transport mechanism being first described in the standby condition and sequentially thereafter in the play operation, the fast forward operation, the rewind operation and certain other operations under specific conditions.

In the standby condition of the mechanism, a conventional source of alternating current (not shown) is connected to the tape deck transport mechanism, the elapsed tape indicator switch ETI–1 is closed and none of the function selecting switches are operated. In this condition, current flows through the top of the secondary winding of transformer T–1 and is rectified by rectifier Re–16 to charge condenser C–3 in a known manner. The rectified current from rectifier Re–16 also energizes forward motor FM–1 and rewind motor RM–1 in series, to maintain a constant standby brake on the mechanism and tape during the time the machine is in the standby condition. The path of the rectified current in the series circuit of motors FM–1 and RM–1 may be traced as extending from rectifier Re–16, contacts 143, 133, 125, forward motor FM–1, contacts 123, 117, rewind motor RM–1 and to the return, or lower end, of the secondary winding of transformer T–1.

It is pointed out that as transformer T–1 is a step-down transformer, the output of rectified current from rectifier Re–16 is low. This rectified current is further reduced due to forward motor FM–1 and rewind motor RM–1 being energized in series. Since the FM–1 and RM–1 motors rotate in opposite directions, this reduced energizing current is sufficient to cause them to tend to rotate the corresponding take up and supply reels (not shown) simultaneously, thereby maintaining a constant slight tension on the tape. In this manner, all slack on the tape is taken up and no loops will form therein, whereby the tape is not damaged. The tape deck transport mechanism remains in this standby condition until a subsequent desired operation is initiated by the operation of the function selecting switch corresponding to the desired operation.

If it is desired to operate the tape deck transport mechanism in the play operation, the play switch PS–1 is operated and contacts 10 thereof are closed to complete a rectified current circuit for energizing play relay 130 and series relay 140 in series. This circuit may be traced as including the lower conductor extending from the A.C. power source, rectifier Re–15, the winding of series of relay 140, contacts 111, the winding of play relay 130, mu switch MU–1, contacts 10, 121, the elapsed tape indicator switch ETI–1 and the upper conductor to the A.C. power source. It is pointed out that play relay 130 and series relay 140 are both energized by rectified current and that the condenser C–1, which is in shunt of the winding of play relay 130, is also charged.

In actuating its contacts, series relay 140 prepares a point in the circuit to the capstan motor CM–1 at contacts 141 and prepares a point in the energizing circuit to the pressure roller magnet PRM–1 at contacts 142.

In actuating its contacts, play relay 130 opens contacts 131 to render rewind switch RS–1 and forward switch FS–1 ineffective during the present operation, closes contacts 132 to complete an alternating current series energizing circuit for the forward motor FM–1 and the rewind motor RM–1, closes contacts 134 to complete an alternating current energizing circuit for the capstan motor CM–1, performs no useful function for the time being at contacts 135 and 136 and closes contacts 137 to complete a rectified current energizing circuit for the pressure roller magnet PRM–1.

The alternating current series energizing circuit for forward motor FM–1 and rewind motor RM–1 may be traced as extending from the lower conductor of the A.C. power source, the winding of rewind motor RM–1, contacts 117, 123, the winding of forward motor FM–1, contacts 125, 132, 141, the elapsed tape indicator switch ETI–1 and to the upper conductor of the A.C. power source. Since forward motor FM–1 and rewind motor RM–1 are energized in series as described, they will attempt to rotate in opposite directions at a low torque to provide tension on the tape, however these motors do not in themselves move the tape. The energizing circuit for capstan motor CM–1 may be traced as extending from the lower conductor of the A.C. power source, the winding of capstan motor CM–1, contacts 134, 141, the elapsed tape indicator switch ETI–1 and the upper conductor to the A.C. power source. The capstan motor CM–1 thereupon operates to rotate the capstan (not shown) at a normal speed. The circuit for energizing pressure roller magnet PRM–1 may be traced as extending from the secondary winding of transformer T–1, rectifier Re–16, contacts 142, 137, the winding of pressure roller magnet PRM–1 and to the return, or lower, side of transformer T–1. The pressure roller magnet PRM–1 operates to move the pressure roller (not shown) against the rotating capstan, whereby the tape (not shown) is pulled across the record, or playback, heads (not shown).

In this manner, the tape deck transport mechanism operates in the play function, with this operation continuing until play switch PS–1 is released. When play switch PS–1 is released, contacts 10 thereof are opened and the previously traced alternating current series energizing circuit of play relay 130 and series relay 140 is opened. Since series relay 140 is constructed as being fast-to-release, this relay restores immediately. However, play relay 130 is maintained operated for the period of time that it takes the charge in condenser C–1 to completely discharge through the winding of the relay.

In restoring, series relay 140 opens contacts 141 to remove the alternating current power source from the previously traced energizing circuit to forward motor FM–1 and rewind motor RM–1 and also opens the previously traced circuit to capstan motor CM–1. Contacts 142 also restore to open the previously traced circuit to the pressure roller magnet PRM–1, which releases to restore the pressure roller. Contacts 143 upon restoring, complete rectified current energizing circuits for forward motor FM–1 and capstan motor CM–1 in series and for rewind motor RM–1, which is connected in parallel with the series energized forward motor FM–1 and capstan motor CM–1. This specific circuit arrangement is maintained complete under control of play relay 130, which in itself is maintained operated by the charge on the condenser C–1. The rectified current energizing circuit for rewind motor RM–1 may be traced as extending from the secondary winding of transformer T–1, rectifier Re–16, contacts 143, 135, 117, the winding of rewind motor RM–1 and back to the secondary winding of the transformer T–1. The rectified current series energizing circuit for forward motor FM–1 and capstan motor CM–1 may be traced as extending from the secondary winding of transformer T–1, rectifier Re–16, contacts 143, 135, 123, the winding of forward motor FM–1, contacts 125, 132, 134, the winding of capstan motor CM–1 and back to the secondary winding of the transformer T–1. Since forward motor FM–1 and capstan motor CM–1 are connected in series with one another and then connected in parallel with the rewind motor RM–1 as mentioned, there is a difference in resistance between these two connections and more current will flow through rewind motor RM–1 than through the forward motor FM–1. With this type of a circuit, a differential stoppage brake is provided to stop the tape deck transport mechanism from the play operation. At this time it is assumed that condenser C–1 has completely discharged through the winding of play relay 130. This relay thereafter restores its contacts to open the above-traced rectified current energizing circuits of the series-connected forward motor FM–1 and capstan motor CM–1, which are connected in parallel with the rewind motor RM–1. The restoring of the contacts of play relay 130 recomplete the previously traced rectified current series energizing circuit for the forward motor FM–1 and the rewind motor RM–1. These two motors operate as previously described to apply the low torque standby braking action on the tape while the tape deck transport mechanism is in the standby condition. The tape deck transport mechanism is in the above-mentioned standby condition and ready for operation in other selected functions.

If it is desired to operate the tape deck transport mechanism in the fast forward operation, forward switch FS–1 is operated and contacts 12 thereof are closed to complete a rectified current series energizing circuit for series relay 140 and forward relay 120. This circuit may be traced as including the lower conductor extending from the A.C. power source, rectifier Re–15, the winding of series relay 140, contacts 131, the winding of forward relay 120, contacts 114, 12, the elapsed tape indicator switch ETI–1 and to the upper conductor of the A.C. power source. It will be noted that this alternating current as rectified by rectifier Re–15, is also used for charging condenser C–2, which is in obvious shunt of the winding of forward relay 120.

In actuating its contacts, series relay 140 closes contacts 141 to prepare a point in the circuit to the forward motor FM–1 and opens contacts 143 to prepare a point in a reduced rectified current energizing circuit to the rewind motor RM–1.

In actuating its contacts, forward relay 120 opens contacts 121 to render play switch PS–1 and rewind switch RS–1 ineffective, closes contacts 122 and 124 to complete an alternating current energizing circuit for the forward motor FM–1 and closes contacts 126 to complete the reduced rectified current circuit to the rewind motor RM–1.

The energizing circuit for forward motor FM–1 may be traced as extending from the lower conductor of the A.C. power source, contacts 122, the winding of forward motor FM–1, contacts 124, 141, the elapsed tape indicator switch ETI–1 and to the upper conductor of the A.C. power source. Forward motor FM–1 is thus energized from the full alternating current as mentioned. The reduced rectified current energizing circuit for rewind motor RM–1 may be traced as extending from the secondary winding of transformer T–1, rectifier Re–16, resistance R–1, contacts 136, 133, 126, 117, the winding of rewind motor RM–1 and to the primary winding of transformer T–1. In this manner, forward motor FM–1 operates at full speed from the full A.C. power to wind the tape on the supply reel, with rewind motor RM–1 being energized by the reduced rectified current to provide a slight amount of drag on the rewind motor to insure a tight wind of the tape.

At the time that the desired amount of tape is wound on the supply reel, the forward switch FS–1 is released, with series relay 140 restoring immediately due to its fast-to-release construction and forward relay 120 remaining operated, due to the charge on the condenser C–2, for the time period that it takes condenser C–2 to discharge through the relay.

In restoring, series relay 140 releases contacts 141 to open the previously described energizing circuit to the forward motor FM–1 and contacts 143 close to shunt the current limiting resistance R–1, whereby rewind motor RM–1 is thereafter energized by the full amount of rectified current over the previously traced path. This full amount of rectified current causes rewind motor RM–1 to apply a full braking effect on the tape deck transport mechanism and bring it to a stop. At this time it is assumed that condenser C–2 has completely discharged and forward relay 120 releases to restore contacts 123 and 125 and thereby energize forward motor FM–1 and rewind motor RM–1 in series over the previously described standby braking circuit. These two motors thus apply the standby brake on the mechanism as described before. The tape deck transport mechanism is in the standby condition and in readiness for operation in other desired functions.

If it is desired to operate the tape deck transport mechanism in the rewind operation, rewind switch RS–1 is operated and contacts 11 thereof are closed to complete a rectified current series energizing circuit for series relay 140 and rewind relay 110. This circuit may be traced as including the lower conductor extending from the A.C. power source, rectifier Re–15, the winding of series relay 140, contacts 131, the winding of rewind relay 110, contacts 11 of rewind switch RS–1, contacts 121, the elapsed tape indicator switch ETI–1 and to the upper conductor of the A.C. power source.

In actuating its contacts, series relay 140 closes contacts 141 to prepare a point in a circuit to the rewind motor RM–1 and opens contacts 143 to prepare a point in a reduced rectified current energizing circuit to the forward motor FM–1.

In actuating its contacts, rewind relay 110 opens contacts 111 and 114 to render play switch PS–1 and forward switch FS–1 ineffective, closes contacts 112 to connect condenser C–2 in shunt of its own winding, closes contacts 115 to complete the reduced rectified current energizing circuit to the forward motor FM–1 and closes contacts 116 to complete an alternating current energizing circuit for the rewind motor RM–1.

The alternating current energizing circuit for the rewind motor RM–1 may be traced as extending from the lower conductor of the A.C. power source, the winding of rewind motor RM–1, contacts 116, 141, the elapsed tape indicator switch ETI–1, and to the upper conductor of the A.C. power source. It will be noted that rewind motor RM–1 is thus energized from the full alternating current. The reduced rectified current energizing circuit for forward motor FM–1 may be traced as extending from the secondary winding of transformer T–1, rectifier Re–16, resistance R–1, contacts 136, 133, 125, the winding of forward motor FM–1, contacts 115 and back to the primary winding of transformer T–1. In this manner, rewind motor RM–1 operates at full speed from the full A.C. power to wind the tape on the takeup reel, with forward motor FM–1 being energized by the reduced rectified current to provide a slight amount of drag on the forward motor to insure a tight wind of the tape. It will be noted that the condenser C–2 was charged over the previously traced energizing circuit of the series relay 140 and the rewind relay 110.

At the time that the desired amount of tape is rewound on the takeup reel, rewind switch RS–1 is released and series relay 140 restores immediately due to its fast-to-release construction, with rewind relay 110 remaining operated, due to the charge on the condenser C–2, for the period of time that it takes condenser C–2 to discharge through the rewind relay.

In restoring, series relay 140 releases contacts 141 to open the previously described A.C. energizing circuit to the rewind motor RM–1 and closes contacts 143 to shunt the current limiting resistance R–1, whereby forward motor FM–1 is thereafter energized by the full amount of rectified current over the previously traced path. This full amount of rectified current causes forward motor FM–1 to apply a full braking effect on the tape deck transport mechanism and bring it to a stop. At this time it is assumed that condenser C–2 has completely discharged and rewind relay 110 releases to restore contacts 115 and 117 and thereby energize forward motor FM–1 and rewind motor RM–1 in series over the previously described standby braking circuit. These two motors thus apply the standby brake on the mechanism as previously described. The tape deck transport mechanism is in the standby condition and in readiness to be operated in other desired functions.

If during the operation of the tape deck transport mechanism in any of the functions, the entire supply of tape has been completely wound on either the takeup or supply reels, the elapsed tape indicator switch *Eti*–1 will open in a suitable manner and disconnect the A.C. power supply from the specific relays and motors that are in operation at that time. The opening of the elapsed tape indicator switch ETI–1 corresponds to the release of an operated particular function switch PS–1, RS–1 or FS–1 since the resulting operations are quite similar. When the ETI–1 switch opens, the particular operating motor stops as described when a function switch is released and the particular operated relays restore, also as described, and the braking circuit as described for the specific operating function is completed to stop the tape deck transport mechanism from that function. When the tape deck mechanism has been brought to a stop, forward motor FM–1 and rewind motor RM–1 are energized in series over the previously traced standby braking circuit to apply the standby brake on the mechanism as previously described.

In the event of a power failure from the A.C. power source during the time that the mechanism is operating in any of the functions, the corresponding operated motors will stop and the operated relays will restore from this function in the same manner as if the function selecting switch corresponding to that particular function had been restored. However, spilling of the tape from the supply or takeup reels due to the power failure is prevented, since an alternate braking arrangement using a different source of power, such as will be described hereafter, becomes effective due to the power failure. As mentioned earlier in this section of the operational description, condenser C–3 was charged over an obvious circuit by means of the rectifier Re–16 and the secondary winding of the transformer T–1. The capacitance of condenser C–3 is relatively large, therefore when the power supply fails, condenser C–3 discharges over the previously traced braking circuit, individual to the specific operation that the mechnaism was operating in at the time of the power failure, to initiate the stopping of the mechanism. If it is assumed that the mechanism is operating in the rewind function and power fails as mentioned above, series relay 140 will restore, but rewind relay 110 will remain operated for a period of time, as described, due to the charge on condenser C–2. Condenser C–3 will discharge over the previously traced braking circuit to operate forward motor FM–1, which brings the mechanism to a stop in the manner previously described. The tape deck transport mechanism is thus brought to a full stop in response to a power failure and the tape is prevented from spilling from the reels.

*FIG. 2*

During the following detailed operational description reference will be had with FIG. 2 of the drawings, with the tap deck transport mechanism being first described in the standby condition and sequentially thereafter in the play operation, the rewind operation, the fast forward operation and certain other operations under specific conditions.

In the standby condition of the mechanism, a conventional source of alternating current (not shown) is connected to the tape deck transport mechanism, the elapsed tape indicator switch ETI–2 is closed and none of the function selecting selecting switches are operated. In this condition, current flows through the top winding of auto transformer T–2, out the center tap and is rectified by rectifier Re–26 for charging condenser C–31 in a well-known manner.

Reduced alternating current through the top winding and out the center tap of the transformer T–2 energizes the forward motor FM–2 and the rewind motor RM–2 in series to maintain a constant standby brake on the tape during the time the machine is in the standby condition. This reduced alternating current series energizing circuit for the motors FM–2 and RM–2 may be traced as extending from the uper conductor of the A.C. power source through the upper winding of the transformer T–2, out the center tap thereof, contacts 233, 214, 223, the winding of forward motor FM–2, contacts 225, 217, the winding of rewind motor RM–2 and to the return side of the A.C. power source. This reduced alternating current from transformer T–2 is further decreased due to forward motor FM–2 and rewind motor RM–2 being energized in series. Since the motors FM–2 and RM–2 rotate in oposite directions, this reduced alternating current is sufficient to cause them to simultaneously rotate the corresponding takeup and supply reels (not shown), thereby maintaining a constant slight tension on the tape. In this manner, all slack on the tape is taken up, and no loops will form therein to prevent damage to the tape, The tape deck transport mechanism remains in the standby condition until a subsequent desired operation is initiated by the operation of the function selecting switch corresponding to the desired operation.

If it is desired to operate the tape deck transport mechanism in the play operation, play switch PS–2 is operated and contacts 20 thereof are closed to complete a rectified current circuit for energizing play relay 230 and series relay 240 in series. This circuit may be traced as including the lower conductor extending from the A.C. power source, rectifier Re–25, the winding of series relay 240, contacts 211, the winding of play relay 130, mu switch MU–2, contacts 20, 221, the elapsed tape indicator switch ETI–2 and to the upper conductor of the A.C. power source. It is pointed out that the play relay 230 and series relay 240 are both energized by rectified current and that the condenser C–30, which is in shunt of the winding of play relay 230, is also charged by this rectified current.

In actuating its contacts, series relay 240 closes contacts 241 to prepare a point in an A.C. energizing circuit to the capstan motor CM–2, and to the forward motor FM–2 and rewind motor RM–2 in series, performs no useful function for the time being at contacts 242 and 243 and prepares a point in a rectified current energizing circuit to the pressure roller magnets PRM–2 and PRM–3 at contacts 244.

In actuating its contacts, play relay 230 opens contacts 231 to render the rewind switch RS–2 and forward switch FS–2 ineffective during the present operation, closes contacts 232 to complete the alternating current energizing circuit for the forward motor FM–2 and the rewind motor RM–2 in series, closes contacts 234 to complete the alternating current energizing circuit for the capstan motor CM–2, performs no useful function for the time being at contacts 235 and 236 and closes contacts 237 to complete the rectified current energizing circuit for the pressure roller magnets PRM–2 and PRM–3.

The alternating current energizing circuit for forward motor FM–2 and rewind motor RM–2 in series may be traced as extending from the lower conductor of the A.C. power source, the winding of rewind motor RM–2, contacts 217, 225, the winding of forward motor FM–2, contacts 223, 214, 232, 241, the elapsed tape indicator switch ETI–2 and to the upper conductor of the A.C. power source. It will be noted that forward motor FM–2 and rewind motor RM–2 are now energized by the full A.C. power, however since they are energized in series as mentioned, they will attempt to rotate in opposite directions as previously described at a low torque to provide tension on the tape, however these motors do not in themselves move the tape. The alternating current energizing circuit for capstan motor CM–2 may be traced as extending from the lower conductor of the A.C. power source, the winding of capstan motor CM–2, contacts 234, 241, the elapsed tape indicator switch ETI–2 and to the upper conductor of the A.C. power source. The capstan motor CM–2 thereupon operates to rotate the capstan (not shown) at a normal speed. The rectified current energizing circuit for pressure roller magnets PRM–2 and PRM–3 may be traced as extending from the A.C. power source through the upper winding of auto transformer T–2, out the middle tap thereof, rectifier Re–26, contacts 244, 237, the windings of the pressure roller magnets in parallel and to the return or lower winding of transformer T–2. The pressure roller magnets PRM–2 and PRM–3 operate to move the pressure roller against the rotating capstan, whereby the tape (not shown) is pulled across the record, or playback, heads (not shown).

In this manner the tape deck transport mechanism operates in the play function, with this operation continuing until play switch PS–2 is released. When play switch PS–2 is released, contacts 20 are opened and the previously traced alternating current series energizing circuit for play relay 230 and series relay 240 is opened. Since series relay 240 is constructed as being fast-to-release, this relay restores immediately. However, play relay 230 is maintained operated for the time that it takes the charge in condensor C–30 to completely discharge through the relay.

In restoring, series relay 240 opens contacts 241 to remove the alternating current power from the previously traced series energizing circuit to the forward motor FM–2 and rewind motor RM–2 and also from the previously traced energizing circuit to the capstan motor CM–2. Contacts 244 also restore to open the previously traced circuit to the pressure roller magnets PRM–2 and PRM–3, which release to restore the pressure roller. The restoring of relay 240 causes contacts 245 to close and complete rectified current energizing circuits for rewind motor RM–2, and for the series connected forward motor FM–2 and capstan motor CM–2, which are connected in parallel with the rewind motor RM–2. This specific circuit is maintained under control of play relay 230, which in itself is maintained operated by the charge on the condenser C–30. The rectified current energizing circuit for rewind motor RM–2 may be traced as extending from the center tap of transformer T–2, rectifier RE–26, contacts 245, 235, 217, the winding of rewind motor RM–2 and to the return side of transformer T–2. The rectified current energizing circuit for forward motor FM–2 and capstan motor CM–2 in series, which are connected in parallel with the rewind motor RM–2, may be traced as extending from the center tap of the transformer T–2, rectifier Re–26, contacts 245, 235, 225, the winding of forward motor FM–2, contacts 223, 214, 232, 234, the winding of capstan motor CM–2 and to the return side of the transformer T–2. Since forward motor FM–2 and capstan motor CM–2 are connected in series with one another, and then connected in parallel with the rewind motor RM–2, there is a difference in resistance between these two connections and more current will flow through rewind motor RM–2 than through the forward motor FM–2. With this circuit arrangement, a differential brake is provided to stop the tape deck transport mechanism from the play operation.

At this time it is assumed that the charge on condenser C–30 has completely discharged through the winding of play relay 230 and this relay thereafter restores its contacts to open the above traced rectified current energizing circuits of the forward motor FM–2 and the capstan motor CM–2 and rewind motor RM–2. The restoring of the contacts of play relay 230 recompletes the previously traced alternating current series energizing circuit for the forward motor FM–2 and the rewind motor RM–2. These two motors thereafter operate as previously described to apply the low torque standby braking action of the tape while the tape deck transport mechanism is in the standby condition. The tape deck transport mechanism is thereafter in the standby condition and in readiness to be operated in other selected functions.

If it is desired to operate the tape deck transport mechanism in the rewind operation, rewind switch RS–2 is operated and contacts 21 thereof are closed to complete a rectified current energizing circuit for series relay 240 and rewind relay 210 in series. This circuit may be traced as including the lower conductor extending from the A.C. power source and transformer T–2, rectifier Re–25, the winding of series relay 240, contacts 231, the winding of rewind relay 210, contacts 21, 221, the elapsed tape indicator switch ETI–2 and to the upper conductor extending through transformer T–2 to the A.C. power source. It is pointed out that rewind relay 210 and series relay 240 are both energized by rectified current as mentioned and that the condenser C–28, which is connected in shunt of the winding of rewind relay 210 is also charged.

In actuating its contacts, series relay 240 prepares a point in an alternating current energizing circuit to the rewind motor RM–2 at contacts 241 and 242, performs no useful function for the time being at contacts 243, removes the shunt from resistance R–23 by opening contacts 245 and performs no useful function at contacts 244.

In actuating its contacts, rewind relay 210 opens contacts 211 and 212 to render play switch PS–2 and forward switch FS–2 ineffective, closes contacts 213 and 215 to complete a reduced rectified current energizing circuit to the forward motor FM–2 and closes contacts 116 to complete the alternating current energizing circuit to the rewind motor RM–2.

The energizing circuit for rewind motor RM–2 may be traced as extending from the lower conductor of the A.C. power source and the transformer T–2, the winding of rewind motor RM–2, contacts 216, 242, 241, the elapsed tape indicator switch ETI–2 and from transformer T–2 to the upper conductor of the A.C. power source. It will be noted that the rewind motor RM–2 is thus energized from the full alternating current to operate at full speed. The reduced rectified current energizing circuit for forward motor FM–2 may be traced as extending from the center tap of the transformer T–2, rectifier Re–26, resistance R–23, contacts 236, 213, 223, the winding of forward motor FM–2, contacts 215, and back to the lower winding of transformer T–2. In this manner, rewind motor RM–2 operates at full speed to wind the tape on the takeup reel, with forward motor FM–2 being energized by the reduced rectified current to provide a slight amount of drag on the forward motor FM–2 whereby a tight wind of the tape is insured.

At the time that the desired amount of tape is rewound on the takeup reel, rewind switch RS–2 is released to restore contacts 21, whereby series relay 240 restores immediately due to its fast-to-release construction, with rewind relay 210 remaining operated for the period of time that it takes the charge on condenser C–28 to discharge through the relay.

In restoring, series relay 240 releases contacts 241 and 242 to open the previously traced A.C. energizing circuit to the rewind motor RM–2, closes contacts 243 to complete a reduced alternating current energizing circuit to the rewind motor RM–2, and closes contacts 245 to shunt the current limiting resistor R–23, whereby forward motor FM–2 is thereafter energized by the full amount of rectified current over the previously traced path. This full amount of rectified current causes forward motor FM–2 to apply a full braking effect on the tape deck transport mechanism to bring it to a stop. The reduced alternating current circuit, which may be traced from the center tap of transformer T–2, contacts 243, 216, the winding of rewind motor RM–2, and to the return side of transformer T–2, causes the rewind motor to operate at a slow speed, simultaneously with the braking action of forward motor FM–2, to prevent a tape loop from forming in the tape. The forming of this loop could happen, should the rewind motor RM–2 be completely deenergized at the time that the forward motor FM–2 applied the above-mentioned brake. At this time, it is assumed that condenser C–28 has completely discharged through rewind relay 210. Relay 210 thereupon restores its operated contacts to energize the forward motor FM–2 and the rewind motor RM–2 in series over the previously traced alternating current standby braking circuit. Since the tape deck transport mechanism has stopped from the rewind operation, forward motor FM–2 and rewind motor RM–2 thereafter apply the standby brake on the mechanism as described before. The tape deck transport mechanism is in the standby condition and in readiness to be operated in other desired functions.

If it is desired to operate the tape deck transport mechanism in the fast forward operation, forward switch FS–2 is operated and contacts 22 thereof are closed to complete a rectified current series energizing circuit for series relay 240 and forward relay 220. This circuit may be traced as including the lower conductor extending from the A.C. power source and transformer T–2, rectifier Re–25, the winding of series relay 240, contacts 231, the winding of forward relay 220, contacts 212, 22, the elapsed tape indicator switch ETI–2 and the upper conductor from transformer T–2 to the A.C. power source. It will be noted that this rectified current circuit also charges condenser C–29, which is connected in shunt of the winding of forward relay 220.

In actuating its contacts, series relay 240 closes contacts 241 to prepare a point in an alternating current energizing circuit to forward motor FM–2 and removes the shunt from resistance R–23 by opening contacts 245, thereby preparing a point in a reduced rectified current energizing circuit to rewind motor RM–2.

In actuating its contacts, forward relay 220 opens contacts 221 to render play switch PS–2 and rewind switch RS–2 ineffective, closes contacts 222 and 224 to complete the alternating current energizing circuit to forward motor FM–2 and closes contacts 226 to complete the reduced rectified current energizing circuit to rewind motor RM–2.

The circuit for energizing forward motor FM–2 may be traced as extending from the alternating current power source and transormer T–2, contacts 224, the winding of forward motor FM–2, contacts 222, 241, the elapsed tape indicator ETI–2 and the upper conductor from transformer T–2 to the A.C. power source. It will be noted that forward motor FM–2 is thus energized from the full alternating current. The reduced rectifier current energizing circuit for rewind motor RM–2 may be traced as extending from the center tap of transformer T–2, rectifier Re–26, resistance R–23, contacts 236, 226, 217, the winding of rewind motor RM–2 and to the lower winding of transformer T–2. In this manner, forward motor FM–2 operates at full speed from the full alternating current to wind the tape on the supply reel, and rewind motor RM–2 is energized by the reduced rectified current to provide a slight amount of drag on the rewind motor to insure a tight wind of the tape and also prevent slippage of the tape when stopping from high speeds.

At the time that the desired amount of tape is wound on the supply reel, forward switch FS–2 is released to restore contacts 22, whereby series relay 240 restores immediately due to its fast-to-release construction, with forward relay 220 remaining operated for the period of time that it takes the charge on condenser C–29 to discharge through the relay.

In restoring, series relay 240 releases contacts 241 to open the previously described energizing circuit to the forward motor FM–2 and releases contacts 245 to shunt the current limiting resistance R–23, whereby rewind motor RM–2 is thereafter energized by the full amount of rectified current over the previously traced path. This full amount of rectified current causes rewind motor RM–2 to apply a full braking effect on the tape deck transport mechanism and bring it to a stop. At this time, it is assumed that condenser C–29 has completely discharged and forward relay 220 will thereafter restore to open the previously traced energizing circuits of forward motor FM–2 and rewind motor RM–2 at contacts 222 and 224, and 226 respectively, and closes contacts 223 and 225 to complete the reduced alternating current standby braking circuit for energizing forward motor FM–2 and rewind motor RM–2 in series. These two motors thus apply the standby brake to stop the mechanism as previously described. The tape deck transport mechanism is in the standby condition and in readiness to be operated in other desired functions.

If during the operation of the tape deck transport mechanism in any of the functions, the entire supply of tape has been completely wound on either the takeup or supply reels, the elapsed tape indicator switch ETI–2 will open in a suitable manner and disconnect the full A.C. power supply from the particular relays and motors that are in operation at that time. The opening of the elapsed tape indicator switch ETI–2 corresponds to the release of one of the particular operated function switches PS–2, RS–2 or FS–2, with the resulting operations being quite similar. When the ETI–2 switch opens, the particular operating motor stops as described when the corresponding function switch is released and the specific operated relays restore, also as described, with the braking circuit as described for the specific operating function being completed to stop the tape deck transport mechanism from that function. When the tape deck transport mechanism has been brought to a stop thereby, forward motor FM–2 and rewind motor RM–2 are energized in series over the previously described standby braking circuit to apply the standby brake on the mechanism as previously described.

In the event of a power failure from the alternating current power source during the time that the mechanism is operating in any of the functions, the corresponding operated motors will stop and the operated relays will restore from this function in the same manner as if the function selecting switch corresponding to that function had been restored. In this case, the formerly described braking circuit for that function is no longer effective. However, spilling of the tape from the supply or takeup reels due to the power failure is prevented, since an alternate braking arrangement using a different source of power will take effect such as will be described hereafter. As previously mentioned in the operational description of this section, condenser C–31 was charged over an obvious circuit from transformer T–2 by means of rectifier Re–26. Condenser C–31 is of a relatively large capacitance, therefore when the power supply fails, condenser C–31 discharges over the corresponding braking circuit previously traced for the specific type of function that the machine was operated in to provide the substitute or alternate braking arrangement. In this manner, the tape deck transport mechanism is brought to a full stop after a power failure and the tape is not spilled from the reels. If it is assumed for the sake of explanation that the mechanism has been operating in the fast forward operation when the power supply fails, series relay 240 will restore as previously described and forward relay 220 will be held operated for a period of time due to the charge on the condenser C–29. Condenser C–31 discharges over a circuit extending from the left-hand plate of the condenser, contacts 245, 226, 217, the winding of rewind motor RM–2 and to the right-hand plate of the condenser. Rewind motor RM–2 therefore applies the brake to the mechanism to bring it to a stop without spilling the tape from the reels. The mechanism is brought to a stop from the other operations due to condenser C–31 discharging over the braking circuit corresponding to the operation in effect at the time of the power failure.

Having described our invention and what is considered new and desired to have protected by Letters Patent will be pointed out in the appended claims.

What is claimed is:

1. In a magnetic tape transport mechanism providing bi-directional control of said tape and having a takeup reel and a supply reel for storage of said tape; a source of current; a rewind relay; a series relay; a normally incomplete series circuit including said source of current, said rewind relay and said series relay; a rewind switch for initiating a rewind operation of said mechanism; means operated in response to a manual operation of said rewind switch for completing said series circuit to operate said rewind relay and said series relay;

a rewind motor for controlling said supply reel; a forward motor for controlling said takeup reel; a normally incomplete energizing circuit including said source of current for said rewind motor; a normally incomplete energizing circuit including said source of current for said forward motor; means operated in response to said operation of said series relay for conditioning said normally incomplete rewind motor energizing circuit; means operated in response to said operation of said rewind relay for completing said conditioned rewind motor energizing circuit to operate said rewind motor at full speed from said source of current, means operated in response to said operation of said rewind relay for completing said normally incomplete forward motor energizing circuit simultaneous with said operation of said rewind motor; and current limiting means included in said completed circuit to said forward motor for reducing the current flow from said source thereto; said forward motor energized in response to said reduced current flow for exerting a frictional drag on said takeup reel to insure a tight wind of said tape on said supply reel by said rewind motor during said rewind operation.

2. In a magnetic tape transport mechanism such as claimed in claim 1, wherein said means for completing said series circuit is restored in response to the manual release of said rewind switch for opening said series circuit to restore only said series relay; means for maintaining said rewind relay operated for a predetermined period of time after said restoration of said series relay; said means for conditioning said circuit to said rewind motor, restoring in response to said restoration of said series relay for opening said energizing circuit to stop said operation of said rewind motor; a normally incomplete circuit for shunting said current limiting means; and means operated in response to said restoration of said series relay for completing said circuit to shunt said current limiting means, thereby increasing the current flow to said forward motor to operate said forward motor under control of said operated rewind relay; said operating forward motor thereby controlling said takeup reel to bring said mechanism to a stop from said rewind operation during said predetermined period of time that said rewind relay is maintained operated.

3. In a magnetic tape transport mechanism such as claimed in claim 2, wherein said rewind relay is restored in response to the expiration of said predetermined period of time; a normally incomplete standby braking circuit including said source of current and said rewind motor and said forward motor connected in series; and means controlled in response to said restoration of said rewind relay for completing said braking circuit to energize said serially connected rewind motor and said forward motor; said energized rewind and forward motors controlling said respective supply and takeup reels for maintaining a constant tension on said tape stored therein during the time said mechanism is in an unoperated standby condition.

4. In a magnetic tape transport mechanism such as claimed in claim 1, including electrical current storage means normally connected in said circuit to said forward motor; means for connecting said source of current to said storage means to charge said storage means therefrom; said operated series relay restoring, said operating rewind motor stopping and said energized forward motor deenergizing, all in response to a failure of current from said source; said means for maintaining said rewind relay operated for a predetermined period of time after said restoration of said series relay also effective in response to said current failure; a normally incomplete circuit for shunting said current limiting means; and means operated in response to said restoration of said series relay for completing said circuit to shunt said current limiting means; said completed shunting circuit thereby conditioning said circuit to said forward motor for an increase in current flow; said charged storage means discharging over said circuit and said shunt to said forward motor for operating said forward motor by said increased current flow therefrom under control of said operated rewind relay; said operating forward motor thereafter controlling said takeup reel to bring said mechanism to a stop in response to said current source failure in said rewind operation, during said period of time that said rewind relay is maintained operated.

5. In a magnetic tape transport mechanism providing bi-directional control of said tape and having a takeup reel and a supply reel for storage of said tape; a source of current; a forward relay; a series relay; a normally incomplete series circuit including said source of current, said forward relay and said series relay; a forward switch for initiating a forward operation of said mechanism; means operated in response to a manual operation of said forward switch for completing said series circuit to operate said forward relay and said series relay; a rewind motor for controlling said supply reel; a forward motor for controlling said takeup reel; a normally incomplete energizing circuit including said source of current for said rewind motor; a normally incomplete energizing circuit including said source of current for said forward motor; means operated in response to said operation of said series relay for conditioning said normally incomplete forward motor energizing circuit; means operated in response to said operation of said forward relay for completing said conditioned forward motor energizing circuit to operate said forward motor at full speed from said source of current; means operated in response to said operation of said forward relay for completing said normally incomplete rewind motor energizing circuit simultaneous with said operation of said forward motor; and current limiting means included in said completed circuit to said rewind motor for reducing the current flow from said source thereto; said rewind motor energized in response to said reduced current flow for exerting a frictional drag on said supply reel to insure a tight wind of said tape on said takeup reel by said forward motor during said forward operation.

6. In a magnetic tape transport mechanism such as claimed in claim 5, wherein said means for completing said series circuit is restored in response to the manual release of said forward switch for opening said series circuit to restore only said series relay; means for maintaining said forward relay operated for a predetermined period of time after said restoration of said series relay; said means for conditioning said circuit to said forward motor, restoring in response to said restoration of said series relay for opening said energizing circuit to stop said operation of said forward motor; a normally incomplete circuit for shunting said current limiting means; and means operated in response to said restoration of said series relay for completing said circuit to shunt said current limiting means, thereby increasing the current flow to said rewind motor to operate said rewind motor under control of said operated forward relay; said operating rewind motor thereby controlling said supply reel to bring said mechanism to a stop from said forward operation during said predetermined period of time that said forward relay is maintained operated.

7. In a magnetic tape transport mechanism such as claimed in claim 6, wherein said forward relay is restored in response to the expiration of said predetermined period of time; a normally incomplete standby brake circuit including said source of current and said rewind motor and said forward motor connected in series; and means controlled in response to said restoration of said forward relay for completing said braking circuit to energize said serially connected rewind motor and said forward motor; said energized rewind and forward motors controlling said respective supply and takeup reels for maintaining a constant tension on said tape source therein during the time said mechanism is in an unoperated standby condition.

8. In a magnetic tape transport mechanism such as claimed in claim 5, including electrical current storage means normally connected in said circuit to said rewind motor; means for connecting said source of current to said storage means to charge said storage means thereform; said operated series relay restoring, said operating forward motor stopping and said energized rewind motor deenergizing, all in response to a failure of current from said source; said means for maintaining said forward relay operated for a predetermined period of time after said restoration of said series relay also effective in response to said current failure; a normally incomplete circuit for shunting said current limiting means; and means operated in response to said restoration of said series relay for completing said circuit to shunt said current limiting means; said completed shunting circuit thereby conditioning said circuit to said forward motor for an increase in current flow; said charged storage means discharging over said circuit and said shunt to said rewind motor for operating said rewind motor by said increased current flow therefrom under control of said operated forward relay; said operating rewind motor thereafter controlling said supply reel to bring said mechanism to a stop in response to said current source failure in said forward operation, during said period of time that said forward relay is maintained operated.

9. In a magnetic tape transport mechanism; a first, a second and a third motor for bi-directional control of said tape; control means; a source of current; means for operating said control means from said source of current; means operated in response to said operation of said control means for operating said first motor from said source of current to move said tape in a play direction; means operated in response to said operation of said control means for energizing said second and said third motors in series from said source of current; said series energized second and third motors applying opposing equal tension on said tape during said play direction of movement by said operating first motor; electrical current storage means; means for connecting said source of current to said storage means to charge said storage means therefrom; certain of said control means restoring, said first motor stopping and said series energized second and third motors deenergizing, all in response to a failure of current from said source; means for maintaining the remainder of said control means operated for a predetermined period of time after said current failure; a normally incomplete discharge circuit from said storage means including said first and second motor in series and said third motor in parallel therewith; means operated in response to said restoration of said certain control means for completing said discharge circuit to energize said motors from said storage means in accordance with said last-mentioned series-parallel relationship; said energized motors providing an electrical differential brake for maintaining the tension on said tape simultaneous with the stopping of said tape from said play direction of movement, during said predetermined period of time, that said remainder of said control means is maintained operated.

References Cited by the Examiner

UNITED STATES PATENTS

| | | | |
|---|---|---|---|
| 2,445,430 | 7/1948 | Herchenroeder et al. | 318—373 X |
| 2,657,870 | 11/1953 | Pettus | 242—55.12 |
| 2,904,275 | 9/1959 | Selsted et al. | 242—55.12 |
| 2,923,488 | 2/1960 | Gratian et al. | 242—55.12 |
| 2,938,677 | 5/1960 | Flan et al. | 318—60 X |

MILTON O. HIRSHFIELD, *Primary Examiner.*